United States Patent
De Gaetano et al.

(10) Patent No.: US 10,001,986 B1
(45) Date of Patent: Jun. 19, 2018

(54) UPDATING SOFTWARE INSTANCES

(71) Applicant: International Business Machines Corporation, Armonk, NY (US)

(72) Inventors: Rossella De Gaetano, Rome (IT); Sandro Piccinini, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

(21) Appl. No.: 15/428,214

(22) Filed: Feb. 9, 2017

(51) Int. Cl.
G06F 9/44 (2018.01)
G06F 9/445 (2018.01)
G06F 11/14 (2006.01)

(52) U.S. Cl.
CPC .......... *G06F 8/65* (2013.01); *G06F 8/71* (2013.01); *G06F 11/1433* (2013.01)

(58) Field of Classification Search
CPC ........................................... G06F 9/44
USPC ............................... 717/168–172
See application file for complete search history.

(56) References Cited

U.S. PATENT DOCUMENTS

| | | | | |
|---|---|---|---|---|
| 7,318,151 | B1 * | 1/2008 | Harris | G06F 21/572 713/100 |
| 8,910,142 | B2 * | 12/2014 | Valeriano | G06F 8/65 717/172 |
| 9,015,324 | B2 | 4/2015 | Jackson | |
| 9,141,487 | B2 | 9/2015 | Jagtiani et al. | |
| 2005/0203968 | A1 * | 9/2005 | Dehghan | G06F 8/65 |
| 2011/0126168 | A1 | 5/2011 | Ilyayev | |
| 2012/0324069 | A1 | 12/2012 | Nori et al. | |
| 2013/0166967 | A1 * | 6/2013 | Jerde | G06F 11/30 714/48 |

FOREIGN PATENT DOCUMENTS

WO 2015065392 A1 5/2015

OTHER PUBLICATIONS

Mosallanejad et al., "A Hierarchical Self-Healing SLA for Cloud Computing," International Journal of Digtial Information and Wireless Communications (IJDIWC) 4 (1): 42-52, 2014.
August et al., "Cloud Implications on Software Netwrok Structure and Security Risks", Information Systems Research, vol. 25, No. 3, pp. 489-510, Sep. 2014. <<<http://rady.ucsd.edu/docs/faculty/shin/August__Niculescu_Shin.pdf>.

* cited by examiner

*Primary Examiner* — Jae Jeon
(74) *Attorney, Agent, or Firm* — Patterson + Sheridan, LLP (57) ABSTRACT

A daemon agent for updating software instances in a cloud computing system is disclosed. The daemon agent in a first instance of an application detects a failure in a scenario. The daemon agent broadcasts a first message from the first instance to a plurality of peer instances of the application in the computing system to query whether the plurality of instances has experienced the failure. The daemon agent receives a second message from a second instance of the plurality of instances, where the second message indicates that the second instance has not experienced the failure. The daemon agent determines differences between the first instance and the second instance and selects one or more components of the application based on the determined differences. The daemon agent updates the first instance by installing the selected one or more components on the first instance.

20 Claims, 7 Drawing Sheets

UPDATING SOFTWARE INSTANCES

BACKGROUND

The present disclosure relates to updating instances of a software application, and more specifically, to updating instances of a software application in a cloud computing system providing Software as a Service (SaaS).

SaaS is a software licensing and delivery model in which software is licensed on a subscription basis and is centrally hosted. Sometimes SaaS is also referred to as "on-demand software". SaaS provides the consumer the capability to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

SUMMARY

One embodiment of the present disclosure provides a method. The method includes detecting a failure of a first instance of an application, where the first instance is associated with a first version of the application in a computing system. The method also includes broadcasting a first message from the first instance to a plurality of instances of the application in the computing system, where the first message queries whether the plurality of instances has experienced the failure. The method also includes receiving a second message from a second instance of the plurality of instances, where the second message indicates that the second instance has not experienced the failure, and where the second instance is associated with a second version of the application. The method further includes determining one or more differences between the first version and the second version of the application based on the second message, and selecting one or more components of the application based on the determined one or more differences, wherein the selected one or more components correspond to a target version of the application that solves the failure. Additionally, the method includes updating the first instance by installing the selected one or more components on the first instance.

One embodiment of the present disclosure provides a system. The system includes a processor and a memory. The memory contains a program that, when executed on the processor, performs an operation. The operation includes detecting a failure of a first instance of an application, where the first instance is associated with a first version of the application in a computing system. The operation also includes broadcasting a first message from the first instance to a plurality of instances of the application in the computing system, where the first message queries whether the plurality of instances has experienced the failure. The operation also includes receiving a second message from a second instance of the plurality of instances, where the second message indicates that the second instance has not experienced the failure, and where the second instance is associated with a second version of the application. The operation further includes determining one or more differences between the first version and the second version of the application based on the second message, and selecting one or more components of the application based on the determined one or more differences, wherein the selected one or more components correspond to a target version of the application that solves the failure. Additionally, the operation includes updating the first instance by installing the selected one or more components on the first instance.

One embodiment of the present disclosure provides a computer program product. The computer program product includes a computer-readable storage medium having program instructions embodied therewith. The program instructions are executable by a processor and cause the processor to detect a failure of a first instance of an application, where the first instance is associated with a first version of the application in a computing system. The program instructions also cause the processor to broadcast a first message from the first instance to a plurality of instances of the application in the computing system, where the first message queries whether the plurality of instances has experienced the failure. The program instructions also cause the processor to receive a second message from a second instance of the plurality of instances, where the second message indicates that the second instance has not experienced the failure, and where the second instance is associated with a second version of the application. The program instructions further cause the processor to determine one or more differences between the first version and the second version of the application based on the second message, and select one or more components of the application based on the determined one or more differences, wherein the selected one or more components correspond to a target version of the application that solves the failure. Additionally, the program instructions cause the processor to update the first instance by installing the selected one or more components on the first instance.

DETAILED DESCRIPTION

Many software companies provide their customers with SaaS where the core of the software application is hosted in a centralized cloud environment with limited need of installation on the customer site. For example, with SaaS, the customer may only need to install an access program on the customer site to utilize the software application hosted in the centralized cloud environment.

A customer can utilize a software application by accessing a software instance of the software application running in a cloud computing system. Different customers utilizing the software application through SaaS may have different requirements for updating or upgrading the software instances they are using. One way to satisfy the different requirements is to manually update or upgrade the software instances for different customers. For example, an operator can discover that a customer needs to update the software instance that the customer is using and manually determine a suitable version of the software application for updating the software instance.

The present disclosure provides a solution of updating software instances of a software application in a cloud computing system automatically. In one embodiment, a first instance of a software application monitors itself and detects a failure in a scenario. The first instance is associated with a first version of the software application. The first instance broadcasts a message to all peer instances of the software application running in the cloud computing system. The message queries whether the peer instances have experienced the failure. The first instance receives an answer message from a second instance indicating that the second instance has not experienced the failure. The second instance is associated with a second version of the software application. In one embodiment, the second version is higher than the first version. In another embodiment, the second version is lower than the first version. The first instance determines differences between the first version and the second version of the software application based on the received answer message. The first instance selects one or more components of the software application based on the determined differences, where the selected one or more components correspond to a target version of the software application that solves the failure. The first instance updates itself by installing the selected one or more components on the first instance.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. Doing so allows a user to access the computing resources from any computing system attached to a network connected to the cloud (e.g., the Internet).

Figure 1:
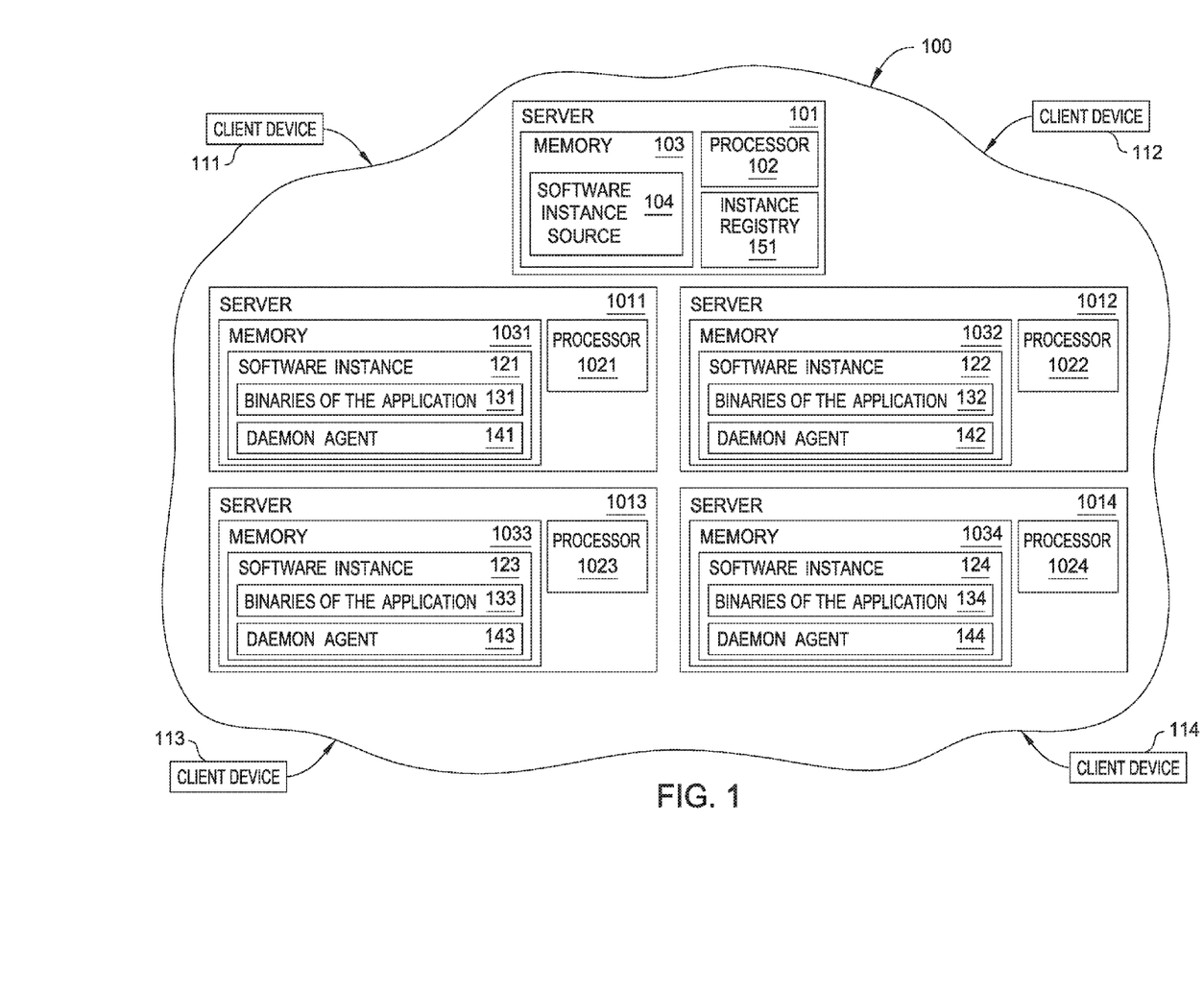
FIG. 1 shows a cloud computing system, according to one embodiment described herein.

With reference now to FIG. 1, a cloud computing system 100 providing SaaS to customers is shown, according to one embodiment described herein. The cloud computing system 100 includes a server 101 to provide SaaS. The server 101 includes a processor 102 and a memory 103. The processor 102 may be any computer processor capable of performing the functions described herein. Although memory 103 is shown as a single entity, memory 103 may include one or more memory devices having blocks of memory associated with physical addresses, such as random access memory (RAM), read only memory (ROM), flash memory or other types of volatile and/or non-volatile memory.

According to one embodiment herein, memory 103 includes a software application source 104 to host the corresponding software application in the server 101. In one embodiment, the software application source 104 includes all binaries or files of all versions (e.g., from the first version to the latest version) of the corresponding software application. In one example, the software application source 104 can assign a unique version name or a unique version number to each version of the software application, as understood in the art. In another example, the software application source 104 can assign the version numbers in increasing order such that a newer version of the software application has a larger version number than an older version, as understood in the art.

The software application source 104 creates a software instance with a suitable version of the software application for a customer to utilize the software application. In one embodiment, the software application source 104 creates software instances running on different servers. As shown in FIG. 1, the software application source 104 creates a plurality of software instances on servers 1011, 1012, 1013 and 1014 respectively. For example, the software application source 104 creates the software instance 121 on the server 1011. The software instance 121 is stored in the memory 1031 and executed by the processor 1021. Similarly, the software application source 104 creates software instances 122, 123 and 124 on different servers 1012, 1013 and 1014 respectively. The software instance 122 is stored in the memory 1032 and executed by the processor 1022. The software instance 123 is stored in the memory 1033 and executed by the processor 1023. The software instance 124 is stored in the memory 1034 and executed by the processor 1024.

Customers use client devices to access the software instances to utilize the software application. For example, customers can use the client devices 111, 112, 113 and 114 to access the software instances 121, 122, 123 and 124 respectively through a network, e.g., the Internet, to utilize the software application. The client devices may be any type of computing device (e.g., portable computing unit, personal digital assistant (PDA), smartphone, laptop computer, mobile phone, navigation device, game console, desktop computer system, workstation, Internet appliance and the like) configured with the capability of connecting to cloud computing system 100 via a network, e.g., the Internet.

In one embodiment as shown in FIG. 1, each of the software instances includes binaries of the application and a daemon agent. For example, the software instance 121 includes binaries of application 131 and a daemon agent 141. In one embodiment, the binaries of the application 131 include binaries or files installed on the software instance 121 corresponding to a version of the software application. In one embodiment, different customers can use different versions of the same set of binaries. For example, a first customer can use a set of binaries including binary component 1, binary component 2 and binary component 3, where binary component 1 has a version a1, binary component 2 has a version a2 and binary component 3 has a version a3. A second customer can use the same set of binaries including binary component 1, binary component 2 and binary component 3, where binary component 1 has a version b1, binary component 2 has a version b2 and binary component 3 has a version b3. In the example as shown in FIG. 1, the binaries of the application 131 include the binaries or files corresponding to a suitable version of the software application for a customer who is using the client device 111 to access the software instance 121. In this example, the binaries of the application 131 may not include all the binaries included in the software application source 104, but only include the necessary binaries or files satisfying the customer's requirement. In other words, the binaries of the application 131 may only include part of the binaries included in the software application source 104. The daemon agent 141 is responsible for updating or upgrading the software instance 121. For example, the daemon agent 141 can detect a need of updating the software instance 121. Then the daemon agent 141 can download additional binaries or files from the software application source 104 and install the downloaded binaries or files on the software instance 121 to update the software instance 121.

Similarly, the software instances 122, 123 and 124 include binaries of the application 132, 133 and 134 respectively. In one embodiment, the binaries of the application 131, 132, 133 and 134 include different versions of the same set of binaries from each other to satisfy requirements of different customers respectively. In other words, the binaries of the application 131, 132, 133 and 134 are corresponding to different versions of the software application to satisfy different customers respectively. Also, the software instances 122, 123 and 124 include daemon agents 142, 143 and 144 respectively. Similarly as the daemon agent 141, the daemon agents 142, 143 and 144 are responsible for updating or upgrading the software instances 122, 123 and 124 respectively. The updating of the software instances through the daemon agents included or installed in the software instances will be described in details below.

In one embodiment, memory 103 also includes an instance registry 151. Information of updated binaries or files of the software instances are registered into the instance registry 151. Such information of updated binaries or files of the software instances can be used to create future software instances.

FIG. 1 only shows one embodiment of the cloud computing system 100. In other embodiments, the software application source 104 creates a different number of software instances of the software application for a different number of customers. In other embodiments, the software application source 104 creates the software instances on a virtual machine (VM) or a container on the server 102.

Figure 2A:
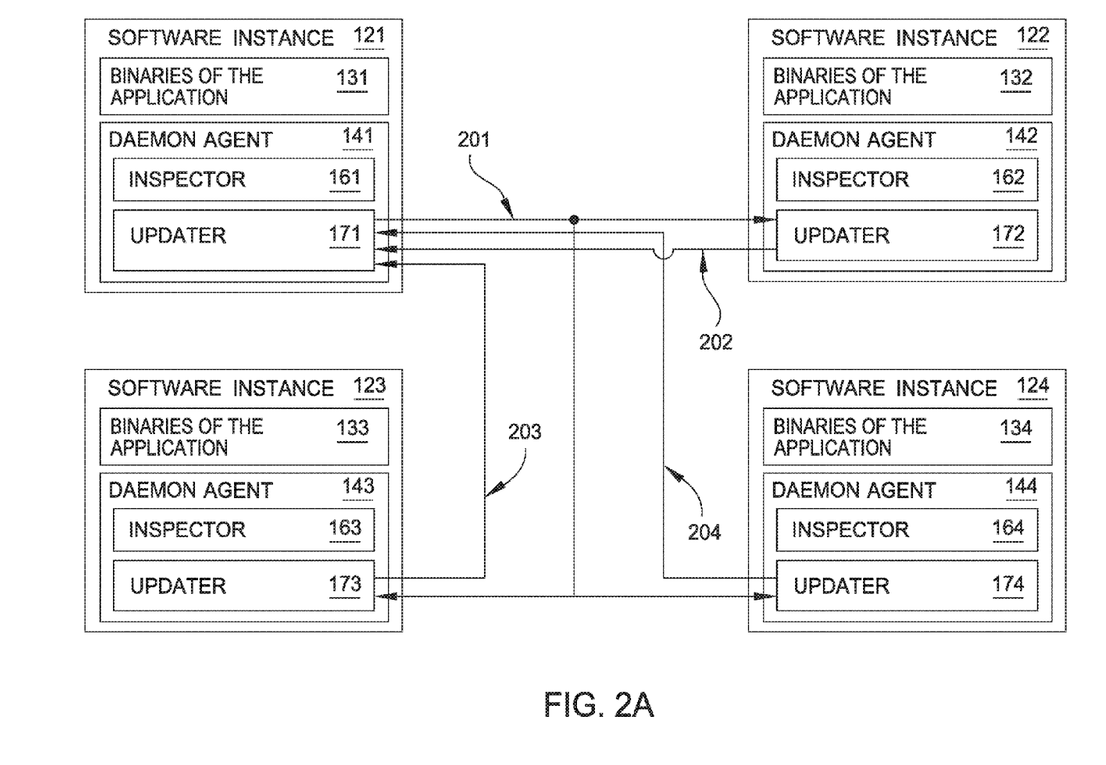
FIG. 2A shows interactions among multiple software instances when updating a software instance, according to one embodiment described herein.

FIG. 2A shows interactions among multiple software instances 121, 122, 123 and 124 when updating the software instance 121, according to one embodiment described herein. As shown in FIG. 2A, each daemon agent of the software instances includes an inspector and an updater. For example, the daemon agent 141 in the software instance 121 includes an inspector 161. The inspector 161 monitors implementation of the software instance 121 to detect a need of updating the software instance 121. For example, the inspector 161 can periodically scan and/or analyze the logs of the software instance 121 (e.g., through tools like logstash) to identify a failure of the software instance 121 in a scenario. A failure of the software instance 121 in a scenario happens when the software instance 121 does not work properly in the scenario. For example, a failure may happen in a scenario that when the customer clicked a "Next Step" button on the Application program interface (API) of the software instance 121, however, the software instance 121 does not proceed to the next step. When the inspector 161 detects a failure, the inspector 161 can determine that the software instance 121 needs to be updated to solve or avoid the failure. Similarly, as shown in FIG. 2A, in the software instances 122, 123 and 124, the daemon agents 142, 143 and 144 also include respective inspectors 162, 163 and 164 to detect failure of the corresponding software instance.

In one embodiment, after detecting the failure of the software instance 121 in a scenario, the inspector 161 notifies the detection of failure to the updater 171. The updater 171 sends a broadcast message 201 to all running peer software instances 122, 123 and 124 to query whether the software instances 122, 123 and 124 have experienced the same failure. In one embodiment, the updaters 172, 173 and 174 in the software instances 122, 123 and 124 receive the message 201. Each of the updaters 172, 173 and 174 replies an answer message to the updater 171. For example, the updater 172 replies an answer message 202 to the updater 171 indicating that the software instance 122 can work properly in the scenario without the failure. In another example, the updater 173 replies an answer message 203 to the updater 171 indicating that the software instance 123 has experienced the same failure in the scenario. In a further example, the updater 174 replies an answer message 204 to the updater 171 indicating that the software instance 124 has not experienced the failure and does not know whether the software instance 124 can work properly in the scenario.

Figure 2B:
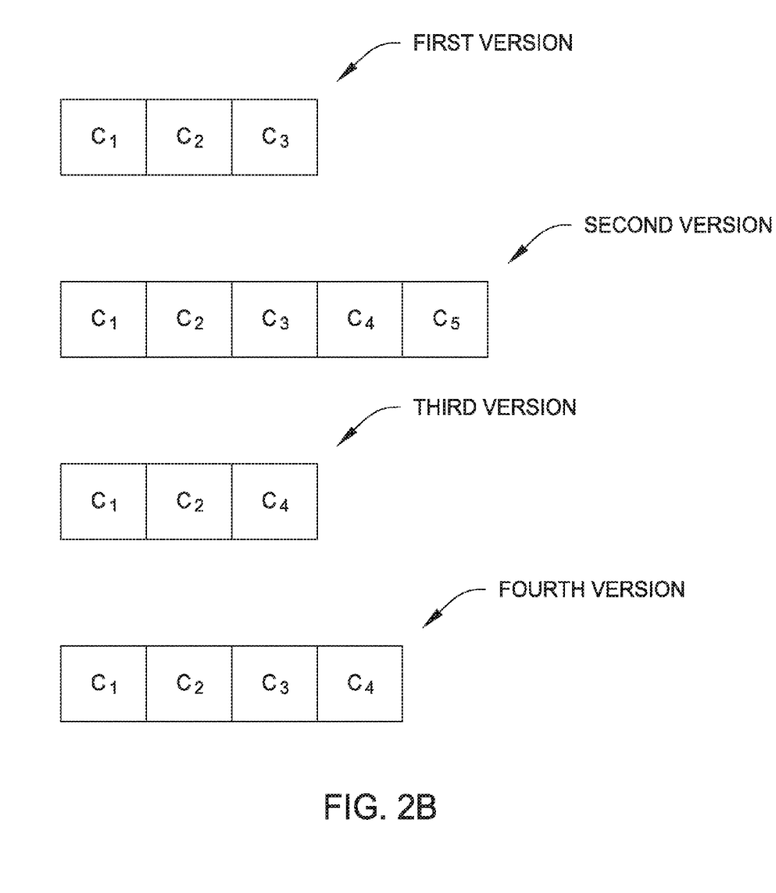
FIG. 2B shows binary components of the software instances involved in a scenario, according to one embodiment described herein.

In one embodiment, the answer messages also indicate binary components involved in the scenario. FIG. 2B shows binary components of the software instances involved in the scenario, according to one embodiment described herein.

As shown in FIG. 2B, in the software instance 121, the binaries of the application 131 include a first version of binary components C1-C3 that are involved in the scenario. The binaries of the application 131 can also include other binary components that are not involved in the scenario (not shown in FIG. 2B). As described above, the software instance 121 failed in the scenario. In the software instance 122, the binaries of the application 132 include a second version of binary components C1-C5. The answer message 202 from the updater 172 indicates that the binary components C1, C2 and C3 in the software instance 122 are involved or used in the scenario. As described above, the software instance 122 can work properly in the scenario. Thus, the answer message 202 indicates that the binary components C1, C2, and C3 with the second version are required for the software instance 122 to work properly in the scenario. In the software instance 123, the binaries of the application 133 include a third version of binary components C1, C2 and C4. As described above, the software instance 123 failed in the scenario. Thus, the answer message 203 indicates that binary components C1, C2 and C4 with the third version are not enough for the software instance 123 to work properly in the scenario. In the software instance 124, the binaries of the application 134 include a fourth version of binary components C1-C4. The answer message 204 from the updater 173 indicates that the software instance 124 has not experienced the failure and does not know whether the software instance 124 with the fourth version of binary components C1-C4 can work properly in the scenario. In one embodiment, the software instances 121-124 include the same set of binaries C1-C5 but with different versions from each other.

In one embodiment, the answer messages further indicate the version of the corresponding software instances. In one example, the answer messages can indicate the version names and/or the version numbers of the corresponding software instances. In another example, the answer messages can indicate the binary components used to build the corresponding software instances. For example, the answer message 202 from the updater 172 indicates that the binary components C1-C5 with the second version are used to build the software instance 122. In other words, the answer message 202 indicates that the software application source 104 uses the binary components C1-C5 to build the software instance 122 which corresponds to a second version of the software application.

After receiving the answer messages 202, 203 and 204 from the software instances 122, 123 and 124, the updater 171 can update the software instance 121 to solve the failure based on the received answer messages, which will be described in details below.

FIG. 2A and FIG. 2B only show some embodiments of the present disclosure. In other embodiments, each software instance can include more than one daemon agent. For example, each software instance may include two daemon agents. One daemon agent includes the inspector to detect failure of the corresponding software instance and another daemon agent includes the updater to interact with other software instances and update the corresponding software instance. In other embodiments, the software application source 104 may use different binary components to build the software instances.

Although FIG. 2A and FIG. 2B show interactions among multiple software instances 121, 122, 123 and 124 when updating the software instance 121, similar interactions are performed when updating another software instance, e.g., the software instance 122, as understood by an ordinary person in the art. For example, the inspector 162 in the software instance 122 can detect a failure of the software instance 122 in a scenario and notify the updater 172. The updater 172 sends a broadcast message to all running peer software instances 121, 123 and 124 to query whether the software instances 121, 123 and 124 have experienced the same failure. After receiving the answer messages from updaters of the software instances 121, 123 and 124, the updater 172 can update the software instance 122 to solve the failure based on the received answer messages.

Figure 3:
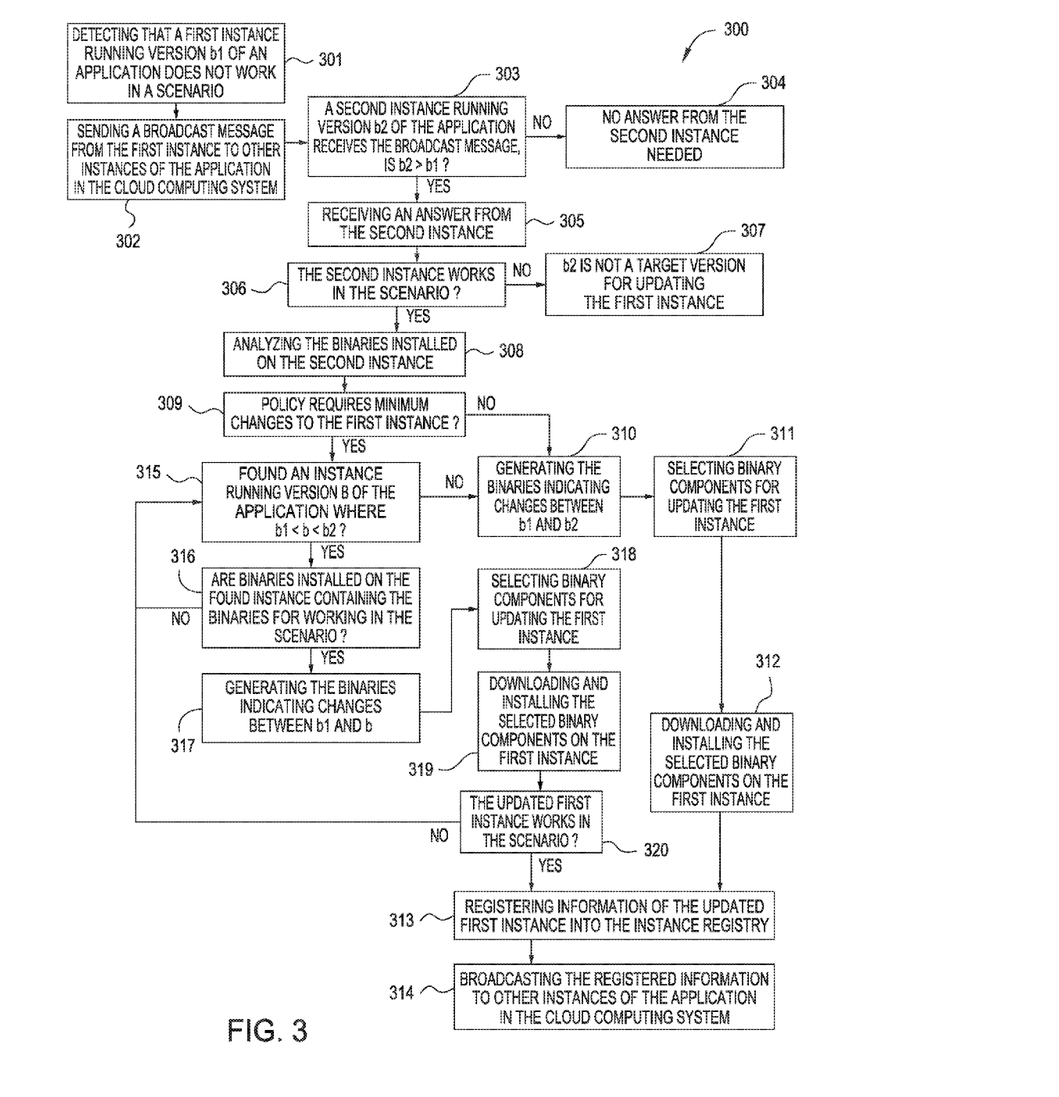
FIG. 3 is a flowchart that illustrates a method of updating a software instance, according to one embodiment described herein.

FIG. 3 is a flowchart that illustrates a method 300 of updating a software instance, according to one embodiment described herein. The method 300 is described using FIGS. 1-3.

At block 301, a daemon agent in a first instance running version b1 of the application detects a failure that the first instance does not work properly in a scenario. For example, as shown in FIG. 2A, the inspector 161 in the daemon agent 141 of the software instance 121 detects a failure, indicating that that the software instance 121 does not work properly in a scenario. The software instance 121 is associated with version b1 of the application. In one embodiment, b1 is a version number. After detecting the failure, the inspector 161 notifies the updater 171 that the software instance 121 needs to be updated to solve the failure.

At block 302, the daemon agent in the first instance sends a broadcast message to other peer instances of the application in the cloud computing system. For example, as shown in FIG. 2A, the updater 171 sends a broadcast message 201 to all running peer software instances 122, 123 and 124 to query whether the software instances 122, 123 and 124 have experienced the same failure. The broadcast message 201 also indicates that the software instance 121 is associated with version b1 of the application, e.g., by indicating the version number b1 of the software instance 121.

At block 303, a second instance running version b2 of the application receives the broadcast message from the first instance. For example, the second instance can be any one of the software instances 122, 123 and 124 as shown in in FIG. 2A. The second instance determines whether its version b2 is higher than the version b1 of the first instance. For example, the updater in the second instance determines whether its version number b2 is higher than the version number b1 of the first instance. In one embodiment, an instance with a higher version includes all the binaries in the instance with a lower version. For example, if the version b2 of the second instance is higher than the version b1 of the first instance, the second instance includes all the binaries in the first instance and includes additional binaries that are not included in the first instance.

If the version number b2 is lower than the version number b1, it indicates that the second instance cannot work properly in the scenario due to its lower version than the failed first instance. In other words, the first instance cannot be updated to a lower version to solve the failure. Thus, if the answer at block 303 is "NO", the method 300 proceeds to block 304. At block 304, the second instance does not need to reply to the broadcast message. In one embodiment, if versions of all peer instances receiving the broadcast message are lower than the version of the failed first instance, the updater of the first instance notifies an operator of the cloud computing system to manually update the first instance, e.g., through manual debug by the operator.

If the answer at block 303 is "YES", the method 300 proceeds to block 305. At block 305, the updater in the second instance replies an answer message to the updater in first instance to indicate whether the second instance has experienced the same failure. For example, as shown in FIG. 2A, the updaters 172, 173 and 174 in the software instances 122, 123 and 124 receive the message 201. As shown in FIG. 2B, the software instances 122, 123 and 124 have higher versions than the software instance 121 (including additional binary components than instance 121). Thus, each of the updaters 172, 173 and 174 replies an answer message to the updater 171.

At block 306, the updater in first instance determines whether the second instance works properly in the scenario based on the received answer message. If the answer at block 306 is "NO", the method 300 proceeds to block 307. At block 307, the updater in first instance determines that the second instance running version b2 of the application is not a target version for updating the first instance. For example, as shown in FIG. 2A, the updater 173 replies an answer message 203 indicating that the software instance 123 has experienced the same failure and cannot work properly in the scenario to the updater 171. Based on the answer message 203, the updater 171 can determine that the version of the software instance 123 (version b2 in this example) is not a target version for updating the software instance 121. In one embodiment, if all peer instances with higher versions than the version of the first instance reply the answer message indicating the same failure, the updater of the first instance notifies an operator of the cloud computing system to manually update the first instance.

If the answer at block 306 is "YES", the method 300 proceeds to block 308. At block 308, the updater in the first instance analyzes the binaries installed on the second instance. In one embodiment, the binaries installed on the second instance indicate changes between version b1 and version b2. For example, as shown in FIG. 2A, the updater 172 replies an answer message 202 indicating that the software instance 122 can work properly in the scenario without the failure to the updater 171. The answer message 202 also indicates that the version of the software instance 122 (version b2 in this example) includes binary components C1-C5 as shown in FIG. 2B. Based on analyzing the answer message 202, the updater 171 knows that the binaries installed on the software instance 122 include binary components C1-C5 with version b2. In one embodiment, at block 308, the updater 171 also determines the differences between the software instance 121 and the software instance 122, e.g., the differences between the binary components C1-C3 with version b1 and the binary components C1-C5 with version b2.

After analyzing the binaries installed on the second instance, the updater in the first instance real time evaluates current policies of the SaaS provider and/or the local policies of the customer to determine the target version for updating the first instance. One exemplary police includes updating the first instance to the version of the second instance that works in the scenario. Another exemplary police includes updating the first instance to a version with minimum changes to the first instance. Another exemplary police includes updating the first instance to the latest version of the software application. Another exemplary police includes updating the first instance to a version that is compliant to a group of customers or a specified customer type.

At block 309, the updater in the first instance determines whether the current policy requires minimum changes to the first instance. If the answer at block 309 is "NO", the method 300 proceeds to block 310. At block 310, the updater in the first instance notifies the software application 104 to generate the binaries indicating changes between version b1 and version b2. For example, the updater 171 notifies the software application source 104 to generate binaries indicating changes between binary components C1-C3 with version b1 and binary components C1-C5 with version b2.

At block 311, the updater in the first instance selects binary components for updating the first instance based on the differences between the first instance and the second instance. The selected binary components correspond to a target version of the application that solves the failure. For example, since the current policy does not require minimum changes when updating the instance 121, at block 311, the updater 171 can select binary components C1-C5 with version b2 for updating the instance 121 based on the differences between the software instance 121 and the software instance 122.

At block 312, the updater in the first instance downloads and installs the selected binary components on the first instance to update the first instance. For example, the updater 171 downloads and installs binary components C1-C5 with version b2 from the software application source 104 to update the software instance 121. In another example, the updater 171 downloads and installs binary components indicating changes between the software instance 121 and the software instance 122 to update the software instance 121. After the update, the software instance 121 includes binary components C1-C5 with version b2. That is, the updated software instance 121 has the same version b2 as the software instance 122 (b2 is the target version in this example). Thus, the updated software instance 121 can work properly in the scenario and solve the failure. In one embodiment, the updater in the first instance keeps memories of the installed binary components, e.g., through tools like chef.

At block 313, the updater in the first instance registers information of the updated first instance into the instance registry. For example, the updater 171 registers information of the updated instance 121 including binary components C1-C5 with version b2 into the instance registry 151. At block 314, the updater in the first instance broadcasts the registered information to other instances of the application in the cloud computing system. For example, the updater 171 broadcasts the registered information of the updated instance 121 including binary components C1-C5 with version b2 to other instances of the application in the cloud computing system 100. With the registered information, other instances know that an instance including binary components C1-C5 with version b2 can work properly in the scenario.

On the other hand, if the updater in the first instance determines that the current policy requires minimum changes to the first instance, the answer at block 309 is "YES". In this situation, the updater in the first instance does not update the first instance from version b1 to version b2. For example, as described above, the answer message 202 indicates that binary components C1, C2, and C3 are required for the software instance 122 to work properly in the scenario and binary components C4 and C5 are not required. Thus, based on the answer message 202, the updater 171 does not update the software instance 121 to the version b2 of the software instance 122. Instead, the method 300 proceeds to block 315.

At block 315, based on the received answer messages from other peer instances, the updater in the first instance searches for an instance running version b of the application with an answer indicating that the software instance has not experienced the failure and does not know whether the software instance can work properly in the scenario, where b1<b<b2. If no such instance is found ("NO" at block 315), the method 300 proceeds to block 310. In this situation, the updater in the first instance cannot find a version with smaller changes than the changes between version b1 and version b2. Thus, the updater in the first instance updates the first instance to the version b2 of the second instance that works properly in the scenario according to blocks 310-314, as described above. For example, the updater 171 updates the software instance 121 to the version b2 of the software instance 122 by installing binary components C1-C5 with version b2 on the software instance 121.

On the other hand, if such an instance is found, the answer at block 315 is "YES". For example, as shown in FIG. 2A, the updater 174 in the software instance 124 replies an answer message 204 indicating that the software instance 124 has not experienced the failure and does not know whether the software instance 124 can work properly in the scenario to the updater 171. As shown in FIG. 2B, the software instance 124 includes binary components C1-C4, which are more than the software instance 121 but less than the software instance 122. Thus, the software instance 124 has a version b, where b1<b<b2. Thus, the updater 171 finds such a software instance 124, and the method 300 proceeds to block 316.

At block 316, the updater in the first instance determines whether binaries installed on the found instance include the required or needed binaries for working in the scenario. For example, as described above, from the answer message 202, the updater 171 knows that binary components C1, C2, and C3 are required for working properly in the scenario. Thus, the updater 171 determines whether the software instance 124 includes the required binary components C1, C2, and C3. If the software instance 124 does not include the required binary components C1, C2, and C3, it indicates that the software instance 124 cannot work properly in the scenario. Thus, the method 300 returns to block 315 to find the next instance with a version between b1 and b2. In one embodiment, the next found instance has a higher version than the previously found instance.

As shown in FIGS. 2A and 2B, the answer message 204 indicates that the binaries installed on the software instance 124 include binary components C1-C4. Thus, in one embodiment, at block 316, the updater 171 determines that the software instance 124 includes the required binary components C1, C2, and C3 ("YES" at block 316). In one embodiment, at block 316, the updater 171 also determines the differences between the software instance 121 and the software instance 124, e.g., the differences between the binary components C1-C3 with version b1 and the binary components C1-C4 with version b. The method 300 proceeds to block 317.

At block 317, the updater in the first instance notifies the software application 104 to generate the binaries indicating changes between version b1 and version b. For example, the updater 171 notifies the software application source 104 to generate binaries including binary components indicating changes between binary components C1-C3 with version b1 and binary components C1-C4 with version b.

At block 318, the updater in the first instance selects binary components for updating the first instance based on the differences between the first instance and the found instance. The selected binary components correspond to a target version of the application that solves the failure. In one embodiment, at block 318, the updater 171 can select binary components C1-C4 with version b for updating the instance 121. The selected binary components C1-C4 correspond to the version b of the software instance 124. In another embodiment, in order to further minimize changes to the first instance, the updater in the first instance selects binary components to create a new target version b' of the application. For example, from the answer message 202, the updater 171 knows that binary components C1, C2, and C3 are required for working properly in the scenario and binary components C4 and C5 are not required. Thus, the updater 171 determines that the instance 121 only needs to install C1-C3 with version b. Therefore, the updater 171 can select binary components C1-C3 with version b for updating the instance 121. By selecting binary components C1-C3 with version b for updating the instance 121, the updater 171 creates a new target version b' including C1-C3 (without C4) with version b.

At block 319, the updater in the first instance downloads and installs the selected binary components on the first instance to update the first instance. For example, the updater 171 downloads and installs binary components C1-C4 with version b from the software application source 104 to update the software instance 121. In another example, the updater 171 downloads and installs binary components indicating changes between the software instance 121 and the software instance 124 to update the software instance 121. After the update, the software instance 121 includes binary components C1-C4 with version b. That is, the updated software instance 121 has the same version b as the software instance 124 (b is the target version in this example). In another example, the updater 171 downloads and installs binary component C1-C3 with version b from the software application source 104 to update the software instance 121. After the update, the software instance 121 includes binary components C1-C3 with version b. That is, the updated software instance 121 has created a new version b' (b' is the target version in this example).

At block 320, the updater in the first instance determines whether the updated first instance works properly in the scenario. In other words, the updater in the first instance verifies whether the updated first instance solves the failure. For example, the updated instance 121 can run in the scenario again to see if it works. If the answer at block 320 is "YES", the method 300 proceeds to block 313, as described above.

If the answer at block 320 is "NO", it indicates that the updated first instance (e.g., the instance 121 updated from version b1 to version b or b') cannot work properly in the scenario. One reason of the failure may be that the updated first instance is not compliant with the customer type. In this situation, the method 300 returns to block 315 to find the next instance with a version between b1 and b2. In one embodiment, the next found instance has a higher version than the previously found instance.

FIG. 3 shows only one embodiment of the present disclosure. In other embodiments, if the current policy does not require minimum changes to the first instance ("NO" at block 309), the updater in the first instance can update the first instance to the highest version of the instance that works properly in the scenario or to the latest version of the application. In other embodiments, if the current policy does not require minimum changes to the first instance ("NO" at block 309), the updater in the first instance can update the first instance to the version of the instance that first replies an answer message indicating it can work in the scenario to the first instance. In other embodiments, after selecting binary components for updating the first instance at block 318, the updater in the first instance can ask a peer instance (instead of the first instance itself) to install the selected binary components and test if the updated peer instance works in the scenario. For example, if a peer instance can install the selected binary components for free (no monetary charge), the updater in the first instance can ask this peer instance to install the selected binary components and test if the updated peer instance works in the scenario. In other embodiments, after selecting binary components for updating the first instance at block 318, the updater in the first instance can ask the software application source 104 to create a temporary testing instance to install the selected binary components and test if the testing instance works in the scenario. In other embodiments, the inspector in the daemon agent of the updated instance can monitor the logs of the updated instance to see if the scenario fails again in the future. Based on the monitored results, the instance can be further updated if needed. In other embodiments, the daemon agent in the instance can update the instance by querying peer instance of the same application in different cloud computing systems, e.g., cloud computing systems at different locations or countries.

Figure 4:
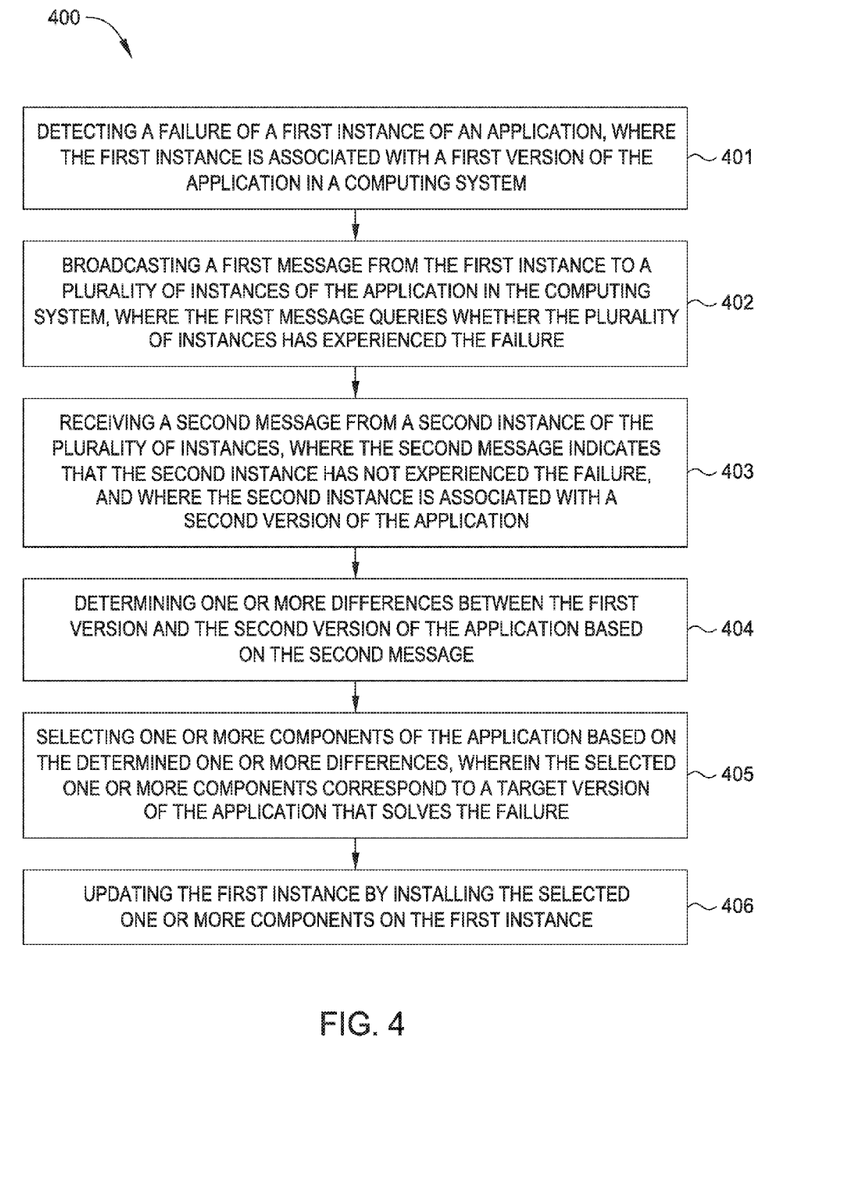
FIG. 4 is a flowchart that illustrates a method of updating a software instance, according to another embodiment described herein.

FIG. 4 is a flowchart that illustrates a method 400 of updating a software instance, according to another embodiment described herein. At block 401, the inspector in the daemon agent of a first instance of an application detects a failure of the first instance, where the first instance is associated with a first version of the application in a computing system 100. At block 402, the updater in the daemon agent of the first instance broadcasts a first message from the first instance to a plurality of instances of the application in the computing system 100, where the first message queries whether the plurality of instances has experienced the failure. At block 403, the updater in the daemon agent of the first instance receives a second message from a second instance of the plurality of instances, where the second message indicates that the second instance has not experienced the failure, and where the second instance is associated with a second version of the application. At block 404, the updater in the daemon agent of the first instance determines one or more differences between the first version and the second version of the application based on the second message. At block 405, the updater in the daemon agent of the first instance selects one or more components (e.g., binary components) of the application based on the determined differences, where the selected one or more component correspond to a target version of the application that solves the failure. At block 406, the updater in the daemon agent of the first instance updates the first instance by installing the selected one or more components on the first instance.

Figure 5:
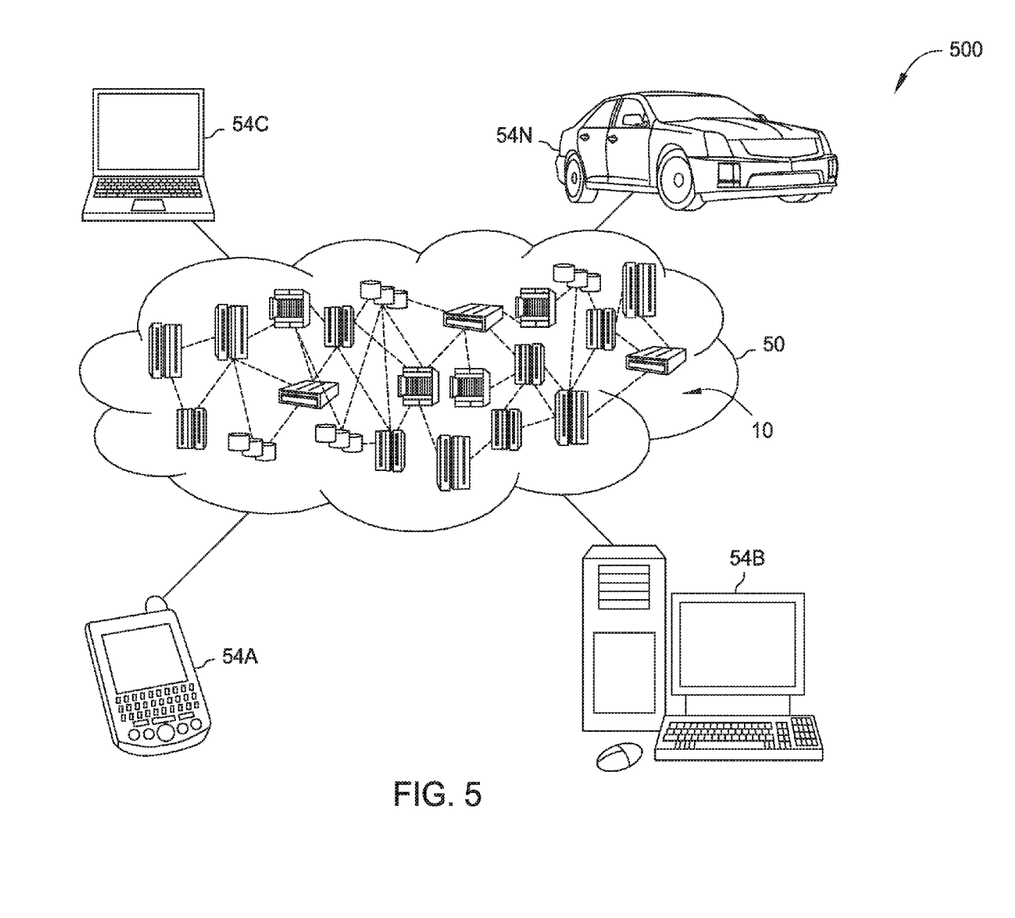
FIG. 5 shows a cloud computing environment, according to one embodiment described herein.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser). In one embodiment, one or more cloud computing nodes 10 include the server 101 to provide SaaS.

Figure 6:
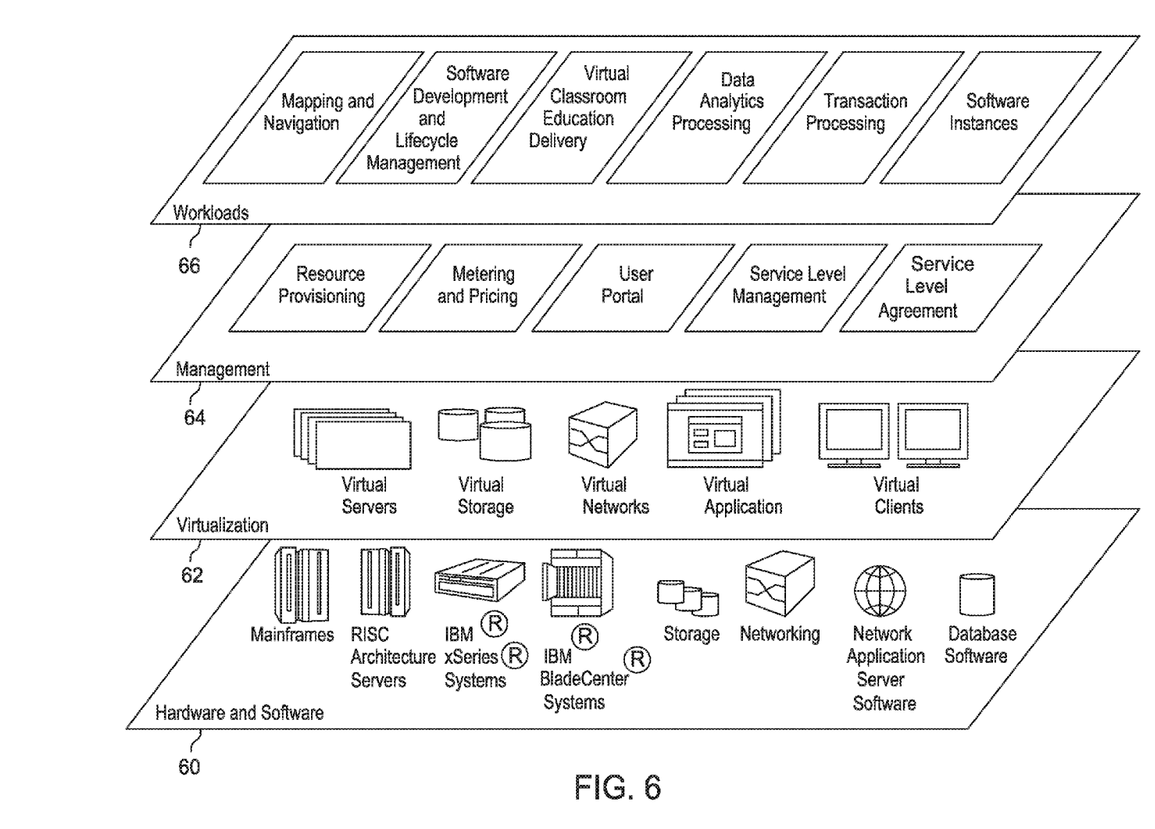
FIG. 6 shows abstraction model layers of the cloud computing environment, according to one embodiment described herein.

Referring now to FIG. 6, a set of functional abstraction layers provided by cloud computing environment 50 (in FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications such as virtual containers and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing. In one embodiment, workloads layer 66 provides software instances of the application.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

While the foregoing is directed to embodiments of the present invention, other and further embodiments of the invention may be devised without departing from the basic scope thereof, and the scope thereof is determined by the claims that follow.

What is claimed is:
1. A method, comprising:
  detecting a failure of a first instance of an application, wherein the first instance is associated with a first version of the application in a computing system;

broadcasting a first message from the first instance to a plurality of instances of the application in the computing system, wherein the first message queries whether each of the plurality of instances has experienced the failure;

receiving a second message from a second instance of the plurality of instances, wherein the second message indicates that the second instance has not experienced the failure, and wherein the second instance includes at least one component that is not included in the first instance, and the second instance is associated with a second version of the application;

receiving a third message from a third instance of the plurality of instances, wherein the third message indicates that the third instance has not experienced the failure, and wherein the third instance includes at least one component that is not included in the first instance, and the third instance is associated with a third version of the application;

determining one or more first differences between the first version and the second version of the application based on the second message;

determining that a current policy includes making minimum changes when updating the first instance;

upon determining that the current policy includes making minimum changes, determining one or more second differences between the first version and the third version of the application based on the third message;

upon determining that the one or more second differences are smaller than the one or more first differences, selecting one or more components of the application based on the one or more second differences, wherein the selected one or more components correspond to a target version of the application that solves the failure; and updating the first instance by installing the selected one or more components on the first instance.

2. The method of claim 1, wherein the first message indicates the first version to the plurality of instances.

3. The method of claim 1, wherein the second message indicates the second version to the first instance.

4. The method of claim 1, wherein the second version is higher than the first version.

5. The method of claim 1, wherein the target version is the same as the second version.

6. The method of claim 1, wherein the target version is higher than the first version and lower than the second version.

7. The method of claim 1, further comprising determining whether the updated first instance solves the failure.

8. A system, comprising:
a processor;
a memory containing a program that, when executed on the processor, performs an operation, the operation comprising:
detecting a failure of a first instance of an application, wherein the first instance is associated with a first version of the application in a computing system;
broadcasting a first message from the first instance to a plurality of instances of the application in the computing system, wherein the first message queries whether the plurality of instances has experienced the failure;
receiving a second message from a second instance of the plurality of instances, wherein the second message indicates that the second instance has not experienced the failure, and wherein the second instance includes at least one component that is not included in the first instance, and the second instance is associated with a second version of the application;

receiving a third message from a third instance of the plurality of instances, wherein the third message indicates that the third instance has not experienced the failure, and wherein the third instance includes at least one component that is not included in the first instance, and the third instance is associated with a third version of the application;

determining one or more first differences between the first version and the second version of the application based on the second message;

determining that a current policy includes making minimum changes when updating the first instance;

upon determining that the current policy includes making minimum changes, determining one or more second differences between the first version and the third version of the application based on the third message;

upon determining that the one or more second differences are smaller than the one or more first differences, selecting one or more components of the application based on the one or more second differences, wherein the selected one or more components correspond to a target version of the application that solves the failure; and updating the first instance by installing the selected one or more components on the first instance.

9. The system of claim 8, wherein the first message indicates the first version to the plurality of instances.

10. The system of claim 8, wherein the second message indicates the second version to the first instance.

11. The system of claim 8, wherein the second version is higher than the first version.

12. The system of claim 8, wherein the target version is the same as the second version.

13. The system of claim 8, wherein the target version is higher than the first version and lower than the second version.

14. The system of claim 8, wherein the operation further comprises determining whether the updated first instance solves the failure.

15. A computer program product, comprising:
a computer-readable storage medium having program instructions embodied therewith, the program instructions executable by a processor to cause the processor to:
detect a failure of a first instance of an application, wherein the first instance is associated with a first version of the application in a computing system;
broadcast a first message from the first instance to a plurality of instances of the application in the computing system, wherein the first message queries whether the plurality of instances has experienced the failure;
receive a second message from a second instance of the plurality of instances, wherein the second message indicates that the second instance has not experienced the failure, and wherein the second instance includes at least one component that is not included in the first instance, and the second instance is associated with a second version of the application;
receive a third message from a third instance of the plurality of instances, wherein the third message indicates that the third instance has not experienced the failure, and wherein the third instance includes at least one component that is not included in the first instance, and the third instance is associated with a third version of the application;

determine one or more first differences between the first version and the second version of the application based on the second message;

determine that a current policy includes making minimum changes when updating the first instance;

upon determining that the current policy includes making minimum changes, determining one or more second differences between the first version and the third version of the application based on the third message;

upon determining that the one or more second differences are smaller than the one or more first differences, select one or more components of the application based on the one or more second differences, wherein the selected one or more components correspond to a target version of the application that solves the failure; and update the first instance by installing the selected one or more components on the first instance.

16. The computer program product of claim 15, wherein the first message indicates the first version to the plurality of instances.

17. The computer program product of claim 15, wherein the second message indicates the second version to the first instance.

18. The computer program product of claim 15, wherein the second version is higher than the first version.

19. The computer program product of claim 15, wherein the target version is the same as the second version.

20. The computer program product of claim 15, wherein the target version is higher than the first version and lower than the second version.

* * * * *